United States Patent [19]

Goldfarb et al.

[11] 4,290,705

[45] Sep. 22, 1981

[54] ELECTROMAGNETIC INTERFERENCE REDUCTION FOR ELECTRONIC LINE PRINTERS

[75] Inventors: Samuel Goldfarb, Roslyn; Thomas Reilly, North Lindenhurst, both of N.Y.

[73] Assignee: Litton Systems, Inc., Melville, N.Y.

[21] Appl. No.: 55,658

[22] Filed: Jul. 9, 1979

[51] Int. Cl.³ ............................................. B41J 11/26
[52] U.S. Cl. .................................... 400/618; 400/119; 101/93.04; 346/101
[58] Field of Search ......................... 101/93.04, 93.05; 400/119, 616.1, 616.3, 636, 618; 340/74 ES; 346/101, 35, 65, 76 PH; 358/297, 300, 11

[56] References Cited

U.S. PATENT DOCUMENTS

| 2,164,227 | 6/1939 | Britten | 400/618 X |
| 2,185,424 | 1/1940 | Anderson | 400/618 X |
| 2,664,988 | 1/1954 | Metzner | 400/618 |
| 2,962,340 | 11/1960 | Alden | 358/300 X |
| 2,963,335 | 12/1960 | Hall et al. | 358/300 X |
| 3,259,288 | 7/1966 | Wassermann | 400/618 X |
| 3,293,653 | 12/1966 | Amada | 400/119 X |
| 3,752,288 | 8/1973 | Detig et al. | 400/119 |
| 3,843,955 | 10/1974 | Pear | 101/93.04 X |
| 3,845,850 | 11/1974 | Herr et al. | 101/93.04 X |
| 3,939,481 | 2/1976 | Mary et al. | 358/300 X |

Primary Examiner—Edward M. Coven
Attorney, Agent, or Firm—Robert F. Rotella

[57] ABSTRACT

An electronic line printer characterized by reduced electromagnetic interference, comprising a printer chassis including record medium storage means; a platen mounted on said chassis and adapted to be in contact with the record medium; electronic printing means for contacting said record medium for printing visible symbols on said record medium; and record medium tensioning means for increasing the tension of said record medium in the vicinity of said platen.

4 Claims, 1 Drawing Figure

U.S. Patent  Sep. 22, 1981  4,290,705
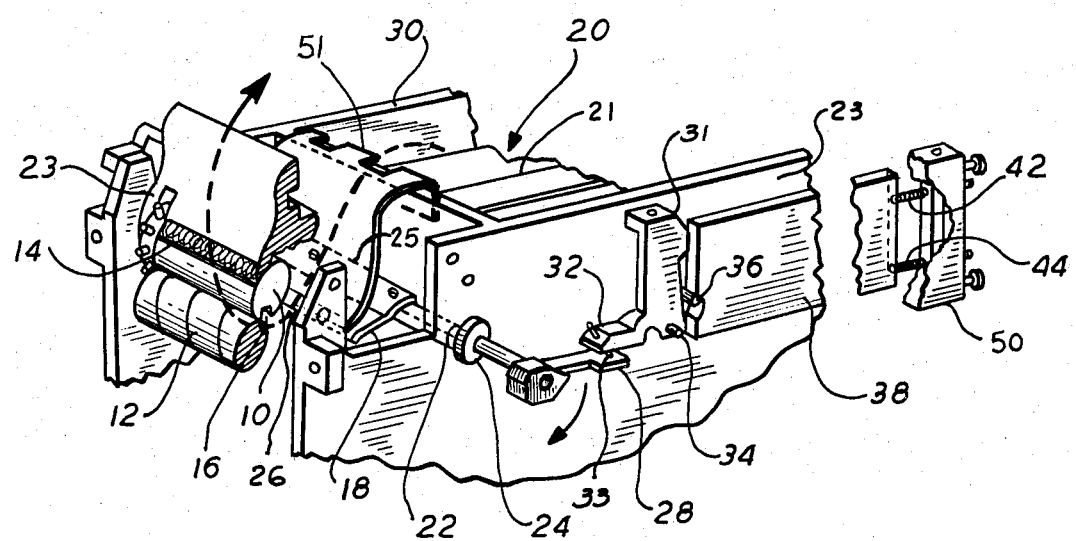

ELECTROMAGNETIC INTERFERENCE REDUCTION FOR ELECTRONIC LINE PRINTERS

This invention relates to electronic line printers and to improvements in reducing electromagnetic interference therefrom.

BACKGROUND OF THE INVENTION

Electronic line printers generaly utilize a platen and rotating helix which contacts the surface of specially coated paper and, when electrically activated by a suitably high voltage, the paper darkens resulting in a visible image.

The printed paper emerges from an egress slot of the printer. Electromagnetc interference (EMI) noise generated within the printer, and particularly the noise generated by the high voltage in the helix to platen (ground) region, which is required in the printing process to remove the front coating from the conductive paper, is a source of EMI contamination to the surrounding region.

It is necessary to reduce the residual voltage on the paper, so that a very low level remains, in order to bring the EMI contamination to acceptable limits, as determined by testing methods long established in the industry.

The common prior art approaches to reduce residual noise on emerging conductive papers or tapes involves the use of conductive (usually metallic) brushes or fingers or by using pressure rollers (which are grounded), as well as EMI baffles for the higher frequencies. However, as restrictive (stationary fingers or brushes) devices are placed in the paper path, it becomes more difficult to exit the paper without paper jams. Rotating conductive rollers require considerable (pressure) force to effectively ground the paper, causing problems associated with paper feed and paper "metering". As an example, if the force is excessive the pressure rollers become driving members, causing paper to rip at the sprockets as this force overtakes the sprocket forces which previously were controlling the paper feed rate. Thus, slip clutches must be used in one of these driving mechanisms to avoid "kinematic" duplication of function with the resultant system failure (i.e. shredded or crumpled paper). The system becomes complicated, space and weight are consumed, and more power is required.

SUMMARY OF THE INVENTION

According to the present invention by applying firm pressure (grounding) to the paper against the platen adjacent to the print line and by providing a voltage discharge mechanism adjacent to the paper both before and after the print line, the voltage level on the paper as it emerges from the exit slot is significantly reduced, and indeed, EMI noise is also reduced to acceptable levels.

It was noted that when the paper was restrained from entering the mechanism area (thus tightening the paper against the platen) and the voltage level (as seen on an oscilloscope when a probe was clamped onto the paper, with the opposite probe end held to chassis ground) was effectively reduced.

It was further noted that print quality improved. The increased pressure on the paper around the drum, and the improvement in grounding the paper, caused less imprint smear and distortion.

Additionally, paper jams have significantly changed. At the pressure point, the paper is driven by the sprockets, and is pulled around the platen. Other techniques, wherein grounding fingers are used downstream in the paper path, cause paper jams because the paper is pushed thru the exit slot. Downstream baffles or restrictions (brushes, etc.) cause a compression load on the paper. Paper, especially fan folded paper, is notoriously ill equipped to handle this type of load. The inventive technique, restraining the paper before the platen slot, keeps the paper in tension, and is therefore, superior to known prior art methods.

A thin sheet of stainless steel has been shaped to behave as a canteliver spring loaded normal to the platen immediately "upstream" of the paper "spring" slot in the platen. The sheet steel extends axially the width of the print line, and is mounted on a shaft supported by sealed bearings on the tray housing. The slot is along the "tangent" line between the helix and platen shafts and is in the location where print is created and the high voltage exists. A flexible conductive material has also been mounted on the platen downstream in the paper path to further ground the paper.

If the shaft is rotated in one direction, the sheet steel clamps against the platen more firmly providing a tighter friction (and EMI grounding) load on the paper. Rotated the other way, a gap is created between the sheet steel and platen permitting ease of paper loading.

A mechanism has been devised and described herein so that when the printer drawer is extended outward to load paper, the gap is automatically created, and when the drawer is shut to print, the shaft on which the sheet steel is mounted is pivoted to provide the necessary preload on the paper (by the sheet steel) to assure compliance to the EMI spec.

One part, at the rear of the unit, has screws which are used to set the center member of the drawer slide so that it always returns to a fixed position (against a pin) when the printer drawer is closed. A second mechanism member is pivoted to rotate to a fixed position at this occurrance. Setscrews on this member can be adjusted to provide the proper rotation of a lever on the sheet steel shaft so that the correct EMI tension is placed on the paper.

Thus, with a minimum number of parts, adaptable to both new designs as well as modifying existing units (if excess EMI contamination is a problem at the printer installation), an EMI improvement has been achieved, and, indeed, print quality improved according to the present invention.

BRIEF DESCRIPTION OF THE DRAWING

The sole FIGURE of the drawing is a perspective view of the printer shown in its open position.

DETAILED DESCRIPTION OF THE INVENTION

Referring now to the FIGURE of the drawing, the electronic line printer 20 includes a chassis 30 which is in the form of a slidably mounted drawer 23 which is enclosed, during printer operation, by a housing (not shown). One portion of the chassis 30 is in the shape of a rectangular tray 21 intended to store the blank record medium having an electrically conductive surface which may be, for instance, coated paper. Drawer 23 may be opened to service the printer 20 components or to reload tray 21 with paper stock.

The outside portion of printer chassis 30 includes a cylindrical platen 10 which is fixed against rotatable movement. A rotatable cylinder around which is wound a wire helix 12 is mounted adjacently of and parallel to the platen 10. The paper is drawn past the platen 10 and helix 12 by means of a motor driven sprocket wheel 23 having teeth for engaging the paper punched at its margin. A flexible gasket 14 formed of radio frequency conductive material is provided at the egress point of the paper medium to further reduce EMI noise.

In operation, the blank paper is fed from the paper tray 21 through the adjacent platen 10 and helix 12. While the paper moves past platen 10, the helix 12 driven by suitable motor means rotates and the wire thereon which contacts the surface of the paper is electrically actuated at intervals so that the matter to be printed is printed in line-by-line elemental segments in a conventional manner common to electronic matrix printers. Since the actual manner of printing onto the paper forms no part of this invention it will not be further described herein.

In order to increase the force of the paper against the platen 10 a spring member 18 is provided. The spring 18 is generally rectangularly shaped and may be made of material such as stainless steel and one longitudinal edge thereof 25 is fastened to a shaft 22 rotatably mounted in chassis 30. A second spring interposed between platen 10 and spring 18 might also be used where it is desired to augment the force further. The axis of shaft 22 is parallel to the axis of platen 10 and helix 12. Shaft 22 is mounted for rotation in a pair of bearings, one of which is shown at 24. The other longitudinal edge 26 of spring 18 is cantilevered to be in proximity to the platen 10 and, when the printer 20 is in operative condition, spring edge 26 applies a force which urges the paper more tightly against the platen 10. The rear paper guide 51 augments the effectiveness of spring 18 by increasing the force applied to the paper and improving the grounding. The free edge 26 of spring 18 is in contact with the free edge of guide 51; both free edges being in contact with the paper.

The platen 10 is also provided with a longitudinally-extending slot or channel 16. As the paper moves across the surface of platen 10 it tends to fall into the channel 16 and thus forms a slight depression in the channel area. The effect of the paper depression is to cause the channel 16 to act as if it were a spring pulling the paper into the channel with a force which depends on the amount of tension applied to the paper by the cantilevered edge 26 of spring 18.

When the printer 20 is in operating condition the drawer 23 of chassis 30 is inserted into the printer housing. Drawer 23 is movable along a pair of slides, one of which is shown at 38. When the drawer 23 is moved from an open to a closed position within the printer housing, the end of drawer slide 38 impinges on a pin 36 fastened to a bell crank lever 31 pivoted at 34. One arm 32 of lever 31 is provided with a set screw projection 33 which is in proximity to an arm 28 connected to and substantially perpendicular to shaft 22.

As drawer 23 is moved to the closed position, slide 38 strikes pin 36 of lever 31 and causes the lever to pivot around pin 34. The arm 32 moves in a counterclockwise direction (as viewed in the drawing) and screw 33 moves downward causing arm 28 to also move downward. Thus shaft 22 is turned in a clockwise direction and the cantilevered edge 26 of spring 18 increases the force applied to the paper medium. The tension of the paper medium around platen 10 is consequently increased. A pair of adjusting screws 42, 44 located at the rear edge of slide 38 serve to adjust the amount of force provided by spring 18 when the drawer 23 is in the closed position.

When drawer 23 is moved to the open position arm 28 moves in a counterclockwise direction as lever 31 moves in a clockwise direction as a result of slide 38 being moved away from pin 36.

The upper threaded portions of adjusting screws 42, 44 are fixedly attached to the housing frame 50 of the printer 20 and once the adjustment of screws 42, 44 is made the drawer 23 is slidable relative to such housing.

It can thus be seen that by means of the present inventive arrangement, particularly the application of tension to the paper medium by the cantilever spring 18 in conjunction with the platen channel 16 the pressure applied to the paper medium in the area adjacent to the line of printing is augmented. This provides an improved means for discharging the voltage created by the electronic printing technique and thus the residual EMI noise is reduced. Furthermore, the tighter wrap of the paper medium around the platen 10 improves the quality of the print since it results in less imprint smear and distortion.

What is claimed is:

1. An electronic line printer of the electrical discharge type characterized by reduced electromagnetic interference from such electrical discharge, comprising:
   a printer chassis including record medium storage means;
   a housing for said printer chassis;
   said chassis being positionable within and without said housing;
   a platen comprising a fixed cylindrically-shaped member mounted on said chassis and adapted to be in contact with the record medium;
   electronic printing means for contacting said record medium for printing visible symbols on said record medium; and
   record medium tensioning means;
   said tensioning means comprising a resilient laminar member disposed proximately to said platen and being provided with a free end adapted to be in contact with said record medium for applying a tension force thereto;
   said platen being provided at its surface with a channel;
   said record medium being adapted to be in contact with said platen in the vicinity of said channel;
   said tensioning means being also provided with a fixed end;
   said tensioning means fixed end being attached to an adjusting member comprising a rotatable shaft for adjusting said free end to a position of contact with said record medium and to a position out of contact with said record medium;
   lever means mechanically connected to said housing;
   said adjusting member rotatable shaft being rotated by said lever means in accordance with the position of the printer chassis with respect to said housing; whereby
   when said chassis is positioned within said housing said lever means rotates said adjusting member rotatable shaft which adjusts said tensioning means free end to contact said record medium to thereby increase the tension of said record medium in the vicinity of said platen channel thereby reducing the electromagnetic interference which would otherwise be created by said printing means.

2. An electronic line printer as set forth in claim 1, wherein:
   lever means are coupled to said rotatable shaft and said housing.

3. An electronic line printer as set forth in claim 2, wherein:
   flexible conductive material is mounted on said platen.

4. An electronic line printer as set forth in claim 3, wherein:
   said electronic printing means comprises a helically-wound cylinder adapted to contact the surface of said record medium.

* * * * *